July 2, 1946. T. V. BUCKWALTER 2,403,045
CAR TRUCK
Original Filed Dec. 29, 1941
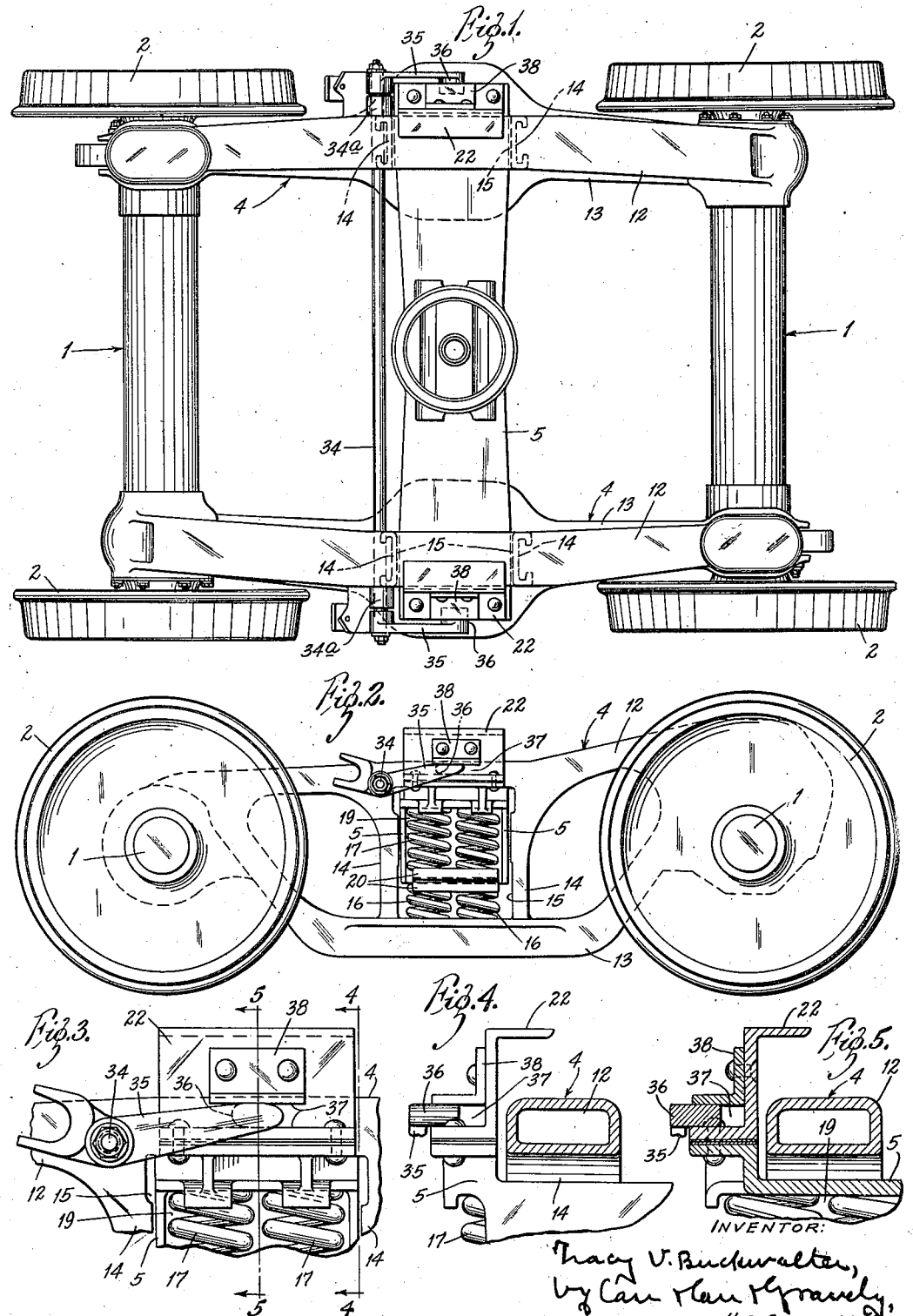

Patented July 2, 1946

2,403,045

UNITED STATES PATENT OFFICE 2,403,045

CAR TRUCK

Tracy V. Buckwalter, Massillon, Ohio, assignor to The Timken Roller Bearing Company, Canton, Ohio, a corporation of Ohio Original application December 29, 1941, Serial No. 424,692, now Patent No. 2,352,162, dated June 27, 1944. Divided and this application April 20, 1944, Serial No. 531,849

4 Claims. (Cl. 105—197)

The subject matter hereof is divided out of my copending application Serial No. 424,692, filed December 29, 1941 for patent for Car truck which has since matured into U. S. Patent No. 2,352,162, granted June 27, 1944.

This invention relates to railway car trucks and has for its particular object to provide a strong and durable, simple and economical arrangement that will equalize the load on the bolster springs and prevent excessive rocking of the car body. The invention consists in the railway car truck and equalizer mounting device and in the combinations and arrangements of parts hereinafter described and claimed.

In the accompanying drawing, which forms part of this specification and wherein like symbols refer to like parts wherever they occur, Fig. 1 is a plan view of a railway car truck provided with a load equalizer embodying my invention, Fig. 2 is a side elevational view of said truck, Fig. 3 is an enlarged fragmentary side elevational view of the truck in the region of the equalizing device; and Figs. 4 and 5 are fragmentary vertical cross-sectional views on the lines 4—4 and 5—5, respectively, in Fig. 3.

In the accompanying drawing, my invention is shown embodied in a railway car truck comprising a pair of axle constructions 1 with wheels 2 fixed to the ends thereof, side frames 4 connecting said axle housing constructions, and a cross beam or bolster 5 extending from side frame to side frame midway of the ends of said truck.

Each side frame 4 comprises a truss structure including a compression member 12 and a tension member 13 that converge toward the ends of said side frame and are connected midway of said ends by a pair of upright bolsters or column guides 14 that form a double strut between said compression and tension members and cooperate therewith to form an opening 15 adapted to receive the adjacent end of the truck bolster 5. The truck bolster 5 has each end yieldably supported in the bolster opening 15 of a side frame 4 for vertical movement relative thereto, preferably by means of two superimposed nests or groups of helical coil springs 16 and 17. The springs 16 of the lower group seat in the pocket or recess provided therefor in the bottom of the bolster opening, and the springs 17 of the upper group seat in a downwardly and outwardly opening pocket or recess 19 provided therefor in the bolster end. Two spring plates 20 are welded together back to back and are interposed between the upper and lower groups of bolster springs, the lower plate forming a cap for the lower spring group and the upper plate forming a seat for the upper spring group.

The truck bolster 5 is provided outwardly of the truck side frames 4 with upstanding Z-shaped side bearing brackets 22 arranged with their webs vertically and with their lower flanges outstanding and riveted or otherwise rigidly secured flatwise to the top of the bolster.

The truck is provided with a device for equalizing the load on the bolster springs and for preventing excessive rocking of the car body. As shown in the drawing, this equalizing device comprises a rod 34 that extends crosswise of the truck alongside of the truck bolster 5 and has its ends journaled in suitable transverse openings or bearings 34a provided therefor in the respective side frames 4. Arms 35 are rigidly secured to the rod 34 outwardly of the side frames and terminate at their outer ends in inwardly extending lugs 36 that seat in horizontal slideways 37 that extend longitudinally of the truck side frame along the outer side faces thereof. The portions of the lugs 36 that engage the top and bottom surfaces of the slideways 37 are convexly curved so as to permit rocking as well as sliding movement of said lugs therein. The horizontal slideways 37 may be formed by the lower portions of the side bearing brackets 22 and angle brackets 38 riveted to the webs of the brackets 22 above the base flanges thereof.

By the arrangement described, the levers 35 rigidly secured to the ends of the torsion rod 34 journaled in the truck side frames 4 are jointly movable in response to an increased load on either side frame and thus serve to equalize the load on the bolster springs. This torsional device also serves to equalize the rocking loads on the bolster springs and thus reduces the rocking tendency of the car body. The load distributing or equalizing device is strong, durable and inexpensive and may be quickly and easily attached to and removed from the car truck and readily repaired without disturbing the parts thereof.

Obviously, the hereinbefore described truck construction admits of considerable modification without departing from the invention. Therefore, I do not wish to be limited to the precise arrangement shown and described.

What I claim is:

1. A car truck comprising wheeled axles, side frames connecting said axles and having bolster openings therein, springs in said bolster openings, a bolster having its ends disposed in said bolster openings and supported on the springs therein, and means mounted on said side frames and cooperating with said bolster for equalizing the load on the bolster supporting springs of both side frames, said means comprising a rock shaft extending crosswise of said truck alongside of said bolster from side frame to side frame and rotatably supported therein, each end of said bolster having a horizontal slideway extending crosswise thereof, and said rock shaft having two arms rigid therewith outwardly of the respective side frames, each directly supported at its free end in a slideway in an adjacent end of said bolster for movement relative thereto both longitudinally and transversely of said truck.

2. A car truck comprising wheeled axles, side frames connecting said axles and having bolster openings therein, springs in said openings, a bolster having its ends disposed in said bolster openings and supported on the springs therein, and means mounted on said side frames and cooperating with said bolster for equalizing the load on the bolster supporting springs of both side frames, said means comprising a rock shaft extending crosswise of said truck alongside of said bolster from side frame to side frame and rotatably supported therein, said bolster having a horizontal slideway extending crosswise of each end thereof, said rock shaft having two arms rigid therewith outside of said side frames and each directly supported at its free end in one of said slideways, the free ends of said arms being convexly curved, whereby said ends of said arms are adapted for rocking as well as sliding movement in said slideways.

3. A car truck comprising wheeled axles, side frames connecting said axles and having bolster openings therein, springs in said bolster openings, a bolster having its ends disposed in said bolster openings and supported on the springs therein, side bearing members rigid with said bolster, said side bearing members having outwardly facing horizontal slideways therein, and a rock shaft extending crosswise of said truck alongside of said bolster from side frame to side frame and rotatably supported therein, said rock shaft having arms rigid therewith each directly supported at its free end in the horizontal slideway of one of said side bearing members for sliding movement relative thereto both longitudinally and transversely of said truck.

4. A car truck comprising wheeled axles, side frames connecting said axles and having bolster openings therein, springs in said bolster openings, a bolster having its ends disposed in said bolster openings and supported on the springs therein, side bearing members rigid with said bolster, said side bearing members comprising brackets secured to the top of said bolster and forming outwardly facing horizontal slideways disposed crosswise of said bolster, and a rock shaft extending crosswise of said truck alongside of said bolster from side frame to side frame and rotatably supported therein adjacent to the top of the bolster opening, said rock shaft having arms rigid therewith outside of said side frames and each directly supported at its free end in the horizontal slideway of one of said side bearing members.

TRACY V. BUCKWALTER.